(12) United States Patent
Zalon

(10) Patent No.: US 9,295,308 B2
(45) Date of Patent: Mar. 29, 2016

(54) ANIMATED DISPLAY BADGE

(71) Applicant: SPARK STUDIOS, LLC, Fairfield, CT (US)

(72) Inventor: Paul Zalon, Fairfield, CT (US)

(73) Assignee: Spark Studios, LLC, Fairfield, CT (US)

( * ) Notice: Subject to any disclaimer, the term of this patent is extended or adjusted under 35 U.S.C. 154(b) by 0 days.

(21) Appl. No.: 14/615,172

(22) Filed: Feb. 5, 2015

(65) Prior Publication Data

US 2015/0216268 A1    Aug. 6, 2015

Related U.S. Application Data

(60) Provisional application No. 61/936,155, filed on Feb. 5, 2014.

(51) Int. Cl.
| | |
|---|---|
| *A44C 3/00* | (2006.01) |
| *F21V 8/00* | (2006.01) |
| *A44C 15/00* | (2006.01) |
| *G09F 13/00* | (2006.01) |

(52) U.S. Cl.
CPC .............. *A44C 3/001* (2013.01); *A44C 15/0015* (2013.01); *G02B 6/0008* (2013.01); *G09F 13/00* (2013.01)

(58) Field of Classification Search
CPC ....................................................... G09F 9/305
USPC ............................................................ 362/570
See application file for complete search history.

(56) References Cited

U.S. PATENT DOCUMENTS

| | | | | |
|---|---|---|---|---|
| 4,215,388 | A  * | 7/1980 | Reimann | 362/104 |
| 5,103,581 | A  * | 4/1992 | Novak | 40/547 |
| 5,575,098 | A  * | 11/1996 | Goettel-Schwartz | 40/550 |
| 6,302,570 | B1 * | 10/2001 | Petell | A42B 1/248 362/554 |
| 6,651,365 | B1 * | 11/2003 | Wainwright | 40/452 |
| 2008/0128300 | A1 * | 6/2008 | Bahar et al. | 206/242 |

* cited by examiner

*Primary Examiner* — Joanne Silbermann
(74) *Attorney, Agent, or Firm* — Berenato & White, LLC

(57) ABSTRACT

A display badge comprises an outer casing having a cover member, a light source disposed within the outer casing, a source of electrical energy electrically connectable to the light source, a fiber optic strand disposed within the outer casing so that a fiber tip of the fiber optic strand extends through the cover member so as to be visible from the outside of the display badge, and a power switch mounted in the outer casing and including a press button partially extending through the cover member. The power switch is electrically connected to the light source and the source of electrical energy so as to selectively turn on the light source by pressing the press button. The fiber optic strand extends between the cover member and the light source, and configured to transmit the light from the light source to the outside of the display badge.

20 Claims, 2 Drawing Sheets

ANIMATED DISPLAY BADGE

CROSS-REFERENCE TO RELATED APPLICATIONS

This application claims the benefit of priority of U.S. provisional application No. 61/936,155 filed on Feb. 5, 2014 by Paul Zalon, which is hereby incorporated herein by reference in its entirety and to which priority is claimed.

BACKGROUND OF THE INVENTION

1. Field of the Invention

This invention relates generally to display badges and, more particularly, to an animated display badge illuminated by lighting elements.

2. Description of the Related Art

Ornamental badges are known in the art and are typically attached by wearer to pockets, lapels and other parts of garments. Conventional badges display identification or other indicia thereon, such as ornamental graphic images. The typical badges include a display area with indicia thereon. Such indicia can include a wearer's name, an identification number, or ornamental graphic images, such as words, names, symbols, letters, graphics, illustrations or pictures. Badges are used in a variety of environments, such as service, retail, employment, military, educational, and meeting environments. The badges are most commonly attached to a wearer's clothing through a variety of fasteners, such as pins, clips, or adhesives.

While known display badges, including but not limited to the discussed above, have proven to be acceptable for various applications, such display badges are nevertheless susceptible to improvements that may enhance their value and performance. With this in mind, a need exists to develop a display badge that advances the art by improving ornamental attractiveness of the display badge.

SUMMARY OF THE INVENTION

The object of the invention is to provide a novel display badge. The display badge comprises an outer casing defining an inner cavity therein and having a cover member, at least one light source disposed within the outer casing and configured to selectively generate a light visible from the outside of the display badge, a source of electrical energy selectively electrically connectable to the at least one light source, at least one fiber optic strand disposed within the outer casing so that a fiber tip of the at least one fiber optic strand extends through the cover member of the outer casing so as to be visible from the outside of the display badge, and a power switch mounted in the outer casing and including a press button partially extending through the cover member. The power switch is electrically connected to the at least one light source and the source of electrical energy so as to selectively turn on the at least one light source by pressing the press button. The at least one fiber optic strand extends between the cover member of the outer casing and the at least one light source, and configured to transmit the light from the at least one light source to the outside of the display badge.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

Figure 1:
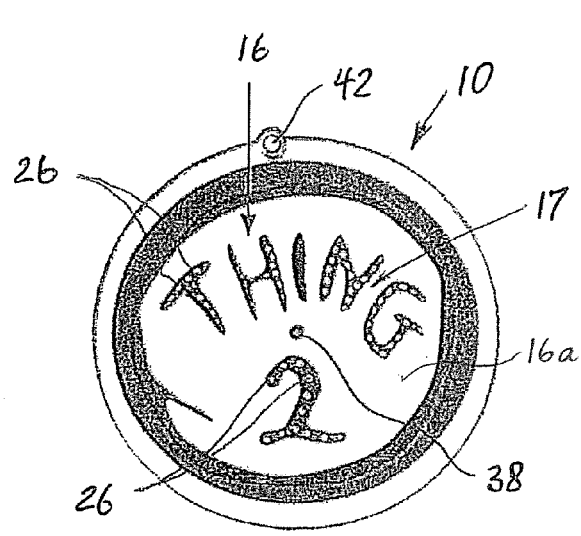
FIG. 1 is a front view of an animated display badge according to an exemplary embodiment of the present invention with an ornamental graphic image.
Figure 2:
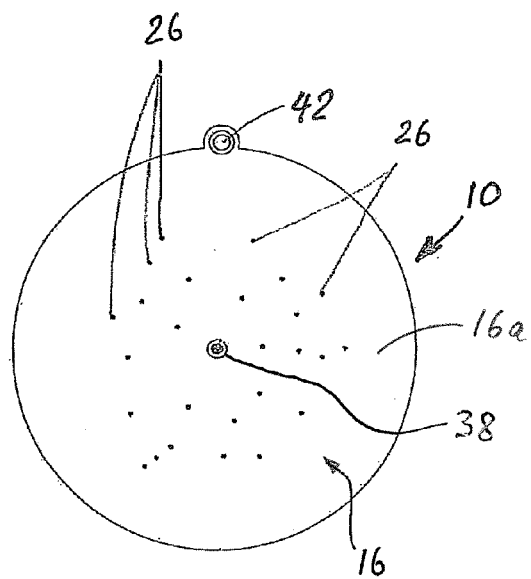
FIG. 2 is a front view of the animated display badge according to the exemplary embodiment of the present invention without the ornamental graphic image.

DETAILED DESCRIPTION OF EXEMPLARY EMBODIMENT AND EMBODIED METHOD OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper," "lower," "right," "left," "top," and "bottom" as well as derivatives thereof (e.g., "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims mean "at least one".

Figure 3:
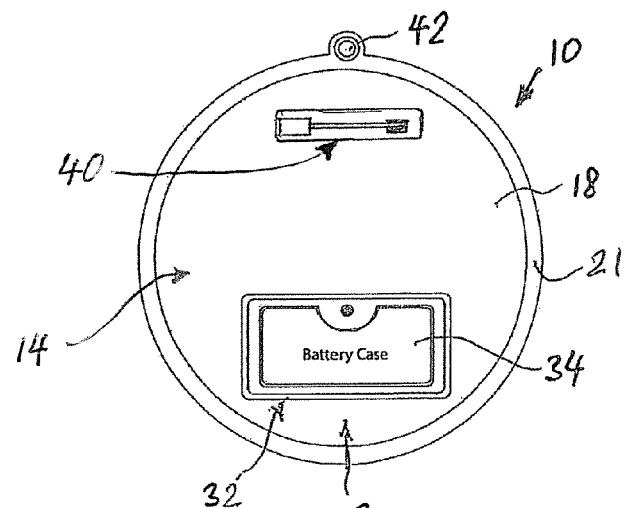
FIG. 3 is a rear view of the animated display badge according to the exemplary embodiment of the present invention with a securing pin.
Figure 4:
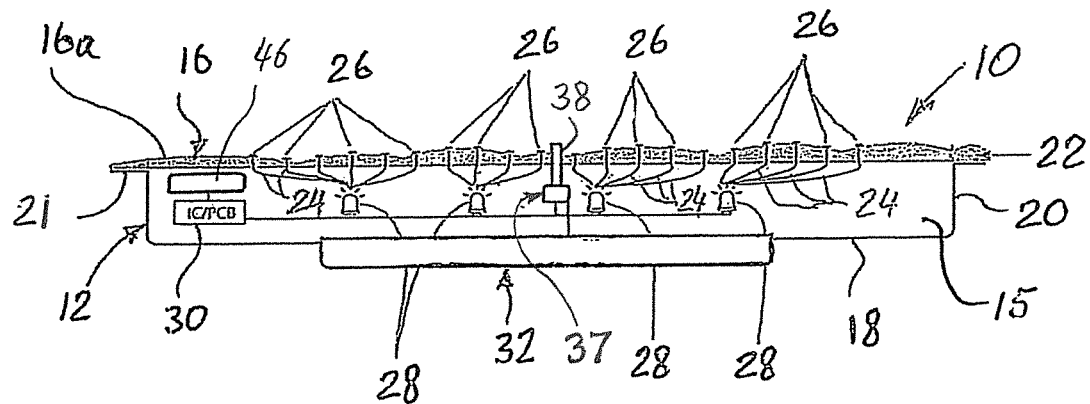
FIG. 4 is a sectional view of the animated display badge according to the exemplary embodiment of the present invention.

FIGS. 1-5 depict an animated display badge 10 according to an exemplary embodiment of the present invention. The display badge 10 comprises a hollow outer casing 12 defining an inner cavity 15 therein. The hollow outer casing 12 includes a base member 14 forming an open cavity therein, and a flexible or rigid cover member 16 closing the open cavity in the base member 14 so as to form the inner cavity 15 in the outer casing 12. The outer casing 12 has a planar bottom portion 18 and a peripheral side wall portion 20 upwardly extending from the bottom portion 18 so as to define the inner cavity 15. A distal end of the side wall portion 20 is provided with a flange 21. Moreover, the cover member 16 is fixed to the flange 21 of the outer casing 12 so as to close the inner cavity 15. According to the exemplary embodiment of the present invention, the outer casing 12 is made of plastic material, such as PVC, by molding, while the cover member 16 is made of a flexible puff vinyl heat sealed to the flange 21 of the casing 12. It should be understood that any other appropriate material for the outer casing 12 and/or cover member 16, such as carton, paper, metal, wood, etc., are within the scope of the present invention. According to the exemplary embodiment of the present invention, the animated display badge 10 further comprises a layer 22 of sponge filling disposed underneath or within the cover member 16, preferably between the cover member 16 and the flange 21 of the outer casing 12, as illustrated in FIG. 4. An outer peripheral surface 16a of the cover member 16 is provided with an ornamental graphic image 17, such as an advertising message, corporate logo or any artwork, embossed of otherwise formed on the outer peripheral surface 16a of the cover member 16, as illustrated in FIG. 1.

Figure 5:
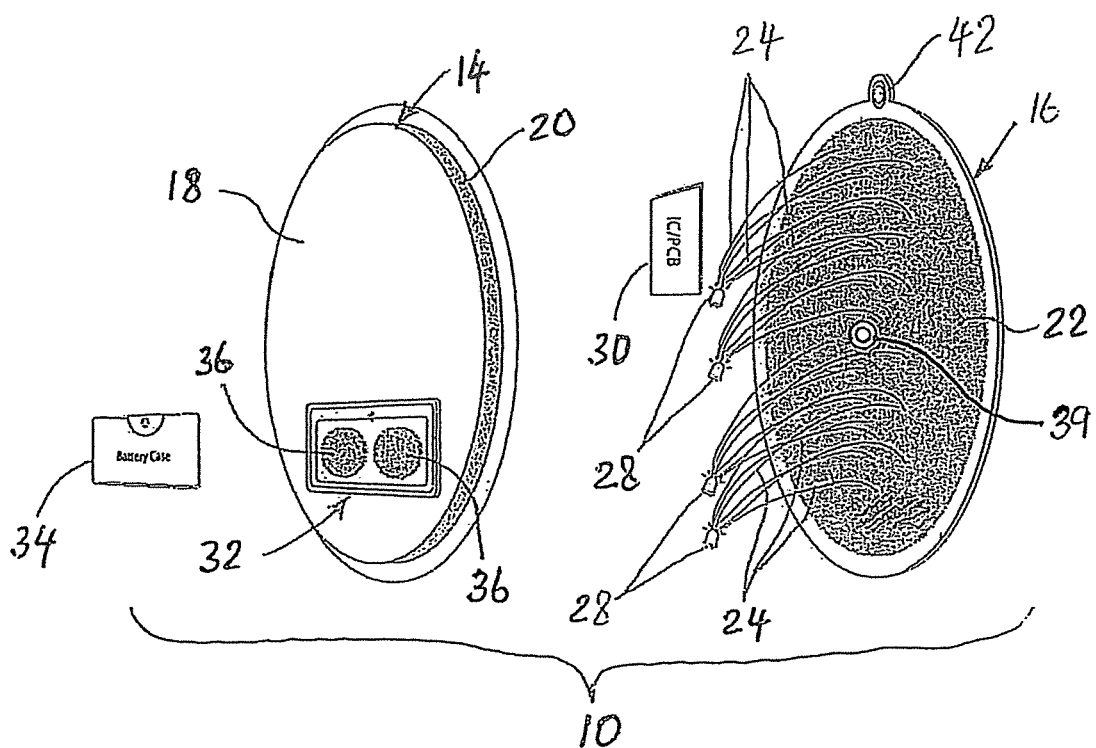
FIG. 5 is an exploded perspective view of the animated display badge according to the exemplary embodiment of the present invention.

One or more fiber optic strands 24 are disposed within the inner cavity 15 between the cover member 16 and the bottom portion 18 of the outer casing 12, as best shown in FIGS. 4 and 5. Fiber tips 26 of the fiber optic strands 24 extend through the sponge filling layer 22 and the outer peripheral surface 16a of the cover member 16 so as to be visible from the outside of the display badge 10. Therefore, the cover member 16 with the fiber optic strands 24 forms a display panel for producing a continuous animated display of the ornamental graphic image 17 utilizing sequenced illumination patterns or arrays of groups of optical fiber strands 24 in a pre-programmed, timed sequence to achieve one or more animation techniques imparting continuous animated motion to the one or more images for producing the desired animated motion on the outer peripheral surface 16a of the cover member 16. The images are formed by the fiber tips 26 of the fiber optic strands 24 defining a series of illumination points formed in the shape of the ornamental graphic image, such as various ornamental and/or decorative images and/or letters.

As shown in FIGS. 4 and 5, the fiber optic strands 24 are linked to one or more light sources 28 disposed in the inner cavity 15 of the outer casing 12. The effect is to be able to illuminate the ornamental graphic image 17 in any pre-programmed sequence. The light sources 28, according to the exemplary embodiment of the present invention, are the light emitting diodes (LEDs). It should be understood that any other appropriate low voltage light source, including colored light emitting diodes or colored lenses placed over the light emitting diodes to produce desired colors or electroluminescent bulbs, are within the scope of the present invention. The inner cavity 15 of the outer casing 12 further houses an electronic control unit 30, preferably in the form of an integrated circuit (IC) or a printed circuit board (PCB), for controlling timing and sequencing of illumination of the light sources 28 so as to produce a continuous animated display of the ornamental graphic image 17 utilizing sequenced illumination patterns or arrays of groups of the optical fiber strands 24 in the pre-programmed, timed sequence to achieve one or more illumination techniques imparting continuous animated motion to the one or more images for producing steady lit, blinking, fading or the desired animated motion on the outer peripheral surface 16a of the cover member 16.

The animated display badge 10 further comprises a battery case 32 provided with a removable cover 34 and attached to the bottom portion 18 of the outer casing 12 outside the inner cavity 15, as best shown in FIGS. 3, 4 and 6. The battery case 32 houses a source of electrical energy 36 to the LEDs 28 and the control unit 30. The source of electrical energy may be an electrical battery, a pack of electrical batteries 36 or similar portable energy source configured to supply electrical energy to the LEDs 28 and the electronic control unit 30. Thus, according to the exemplary embodiment of the present invention, one or more of the electrical batteries 36 are mounted inside the battery case 32 disposed outside the inner cavity 15 of the outer casing 12. The electrical batteries 36 may be replaceable or rechargeable. The cover 34 of the battery case 32 can be opened to replace the electrical batteries 36 as needed. Alternatively, the electrical batteries 36 may be housed in the inner cavity 15 of the outer casing 12.

The animated display badge 10 further includes a power switch 37 having a press button 38, best shown in FIG. 4. The power switch 37 is mounted in the inner cavity 15 of the outer casing 12 so that the press button 38 is inserted into and partially extends through a hole 39 in the cover member 16, as illustrated in FIGS. 1, 2, 4 and 5. According to the exemplary embodiment of the present invention, the ornamental graphic image 17 on the flexible cover member 16 is illuminated, or turned on, by pressing and releasing the press button 38. The illuminated cover member 16 will turn off after a predetermined time expires. According to the exemplary embodiment of the present invention, the LEDs 28, thus the illuminated ornamental graphic image 17, will automatically turn off after approximately 40-60 seconds or any other desired time.

The ornamental graphic image 17 on the cover member 16 of the outer casing 12 may be printed or embossed or embroidered or even be a "blind image" (which means that the ornamental graphic image 17 is not visible until the LEDs 28 light up and lit the fiber optic strands 24.

A speaker 46 is also disposed within the inner cavity 15 of the outer casing 12 and is controlled by the electronic control unit 30 to play additional pre-selected sound effects/and or music when the press button 38 is activated by the user.

The animated display badge 10 also includes a fastener, which may be utilized to secure the animated display badge 10 to a garment. According to the exemplary embodiment of the present invention, the fastener is in the form of a pin member 40 conventionally formed from a resilient wire, as best shown in FIG. 3. Other appropriate fasteners, such as clips or magnets may be employed. As further illustrated in FIG. 3, the pin member 40 is secured (affixed) to the planar bottom portion 18 of the outer casing 12 by any appropriate means, such as by an adhesive bonding or welding.

A flexible attachment member, such as a lanyard (not shown), can be attached to the animated display badge 10. As illustrated in FIGS. 1-3 and 5, the animated display badge 10 also includes a grommet hole 42 formed in the cover member 16 for the lanyard.

In operation, if the user presses and releases the press button 38 of the power switch 37, the LEDs 28 are turned on, and the ornamental graphic image 17 is illuminated in an animated manner (i.e., in a pre-programmed sequence). The illuminated ornamental graphic image 17 will automatically turn off after approximately 40-60 seconds.

The foregoing description of the exemplary embodiment(s) of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A display badge comprising:
   an outer casing defining an inner cavity therein and having a cover member;
   at least one light source disposed within said outer casing and configured to selectively generate a light visible from the outside of said display badge;
   a source of electrical energy selectively electrically connectable to said at least one light source;
   at least one fiber optic strand disposed within said outer casing so that a fiber tip of said at least one fiber optic strand extends through said cover member of said outer casing so as to be visible from the outside of said display badge; and
   a power switch mounted in said outer casing and including a press button partially extending through said cover member;
   said power switch electrically connected to said at least one light source and said source of electrical energy so as to selectively turn on said at least one light source by pressing said press button;
   said at least one fiber optic strand extending between said cover member of said outer casing and said at least one light source and configured to transmit the light from said at least one light source to the outside of said display badge.

2. The display badge as defined in claim 1, wherein an outer peripheral surface of said cover member is provided with an ornamental graphic image so that said cover member with said fiber tip of said at least one fiber optic strand forms a display panel for illuminating said ornamental graphic image.

3. The display badge as defined in claim 1, further comprising an electronic control unit electrically connected to said source of electrical energy and said at least one light source; wherein said electronic control unit is configured to automatically turn said at least one light source on when said power switch is activated by pressing said press button.

4. The display badge as defined in claim 3, wherein said electronic control unit is further configured to control timing and sequencing of illumination of said at least one light source.

5. The display badge as defined in claim 3, wherein an outer peripheral surface of said cover member is provided with an ornamental graphic image so that said cover member with said at least one fiber optic strand forms a display panel for illuminating said ornamental graphic image in any pre-programmed sequence to achieve animation techniques imparting a continuous animated motion to said ornamental graphic image for producing said animated motion on said outer peripheral surface of said cover member.

6. The display badge as defined in claim 5, further comprising a speaker disposed within said inner cavity of said outer casing and controlled by said electronic control unit to play sound effects or music when said power switch is activated by pressing said press button.

7. The display badge as defined in claim 3, wherein said electronic control unit automatically turns said at least one light source off after a predetermined time expires.

8. The display badge as defined in claim 1, further comprising a fastener for securing said display badge to a garment.

9. The display badge as defined in claim 1, wherein said cover member is made of a flexible material.

10. The display badge as defined in claim 1, wherein said at least one fiber optic strand includes a plurality of fiber optic strands disposed within said outer casing so that fiber tips of said fiber optic strands extend through said cover member of said outer casing so as to define a series of illumination points forming an ornamental graphic image;
    said fiber optic strands extend between said cover member of said outer casing and said at least one light source and configured to transmit the light from said at least one light source to the outside of said display badge.

11. The display badge as defined in claim 10, wherein said at least light source includes a plurality of light sources disposed within said outer casing and configured to selectively generate a light; and wherein said fiber optic strands extending between said cover member of said outer casing and said light sources and configured to transmit the light from said light sources to the outside of said display badge.

12. The display badge as defined in claim 10, wherein an outer peripheral surface of said cover member is provided with an ornamental graphic image so that said cover member with said fiber tips of said fiber optic strands forms a display panel for illuminating said ornamental graphic image.

13. The display badge as defined in claim 10, further comprising an electronic control unit electrically connected to said source of electrical energy and light sources; wherein said electronic control unit is configured to automatically turn said light sources on when said power switch is activated by pressing said press button.

14. The display badge as defined in claim 13, wherein said electronic control unit is further configured to control timing and sequencing of illumination of said light sources.

15. The display badge as defined in claim 13, wherein an outer peripheral surface of said cover member is provided with an ornamental graphic image so that said cover member with said tips of said fiber optic strands forms a display panel for illuminating said ornamental graphic image in any pre-programmed sequence to achieve animation techniques imparting a continuous animated motion to said ornamental graphic image for producing said animated motion on said outer peripheral surface of said cover member.

16. The display badge as defined in claim 15, further comprising a speaker disposed within said inner cavity of said outer casing and controlled by said electronic control unit to play sound effects or music when said power switch is activated by pressing said press button.

17. The display badge as defined in claim 13, wherein said electronic control unit automatically turns said light sources off after a predetermined time expires.

18. The display badge as defined in claim 10, further comprising a fastener for securing said display badge to a garment.

19. The display badge as defined in claim 10, wherein said cover member is made of a flexible material.

20. The display badge as defined in claim 10, wherein said source of electrical energy is an electrical battery.

* * * * *